(12) United States Patent
Lv

(10) Patent No.: US 10,499,570 B2
(45) Date of Patent: Dec. 10, 2019

(54) INFLATABLE THERMAL INSULATION SYSTEM AND MULTI-SPAN GREENHOUSE INCLUDING THE SAME

(71) Applicant: Hao Lv, Beijing (CN)

(72) Inventor: Hao Lv, Beijing (CN)

( * ) Notice: Subject to any disclaimer, the term of this patent is extended or adjusted under 35 U.S.C. 154(b) by 648 days.

(21) Appl. No.: 15/200,754

(22) Filed: Jul. 1, 2016

(65) Prior Publication Data

US 2016/0309664 A1   Oct. 27, 2016

Related U.S. Application Data

(63) Continuation of application No. PCT/CN2014/074054, filed on Mar. 25, 2014.

(30) Foreign Application Priority Data

Jan. 2, 2014   (CN) .......................... 2014 1 0001170

(51) Int. Cl.
*A01G 9/22*   (2006.01)
*A01G 9/14*   (2006.01)
*A01G 9/24*   (2006.01)

(52) U.S. Cl.
CPC .............. *A01G 9/225* (2013.01); *A01G 9/14* (2013.01); *A01G 9/1415* (2013.01);
(Continued)

(58) Field of Classification Search
CPC ........ A01G 9/225; A01G 9/14; A01G 9/1438; A01G 9/1415; A01G 9/22; Y02A 40/262; E06B 9/24
See application file for complete search history.

(56) References Cited

U.S. PATENT DOCUMENTS

| 4,290,242 A | * | 9/1981 | Gregory, Jr. ........... | A01G 9/225 52/2.17 |
| 4,301,626 A | * | 11/1981 | Davis ..................... | A01G 9/225 52/2.17 |

(Continued)

FOREIGN PATENT DOCUMENTS

| CN | 2852663 Y | 1/2007 |
| CN | 202068785 U | 12/2011 |

(Continued)

OTHER PUBLICATIONS

"CleanAir Air Control Equipment" DeVilbiss (Year: 2008).*

(Continued)

*Primary Examiner* — Andrew J Triggs
(74) *Attorney, Agent, or Firm* — Westman, Champlin & Koehler, P.A.

(57) ABSTRACT

The present disclosure relates to a greenhouse having an inflatable and thermal insulation system. The greenhouse includes a lateral frame, a vertical frame, a top cover, an inflatable and thermal insulation system and a plurality of rotary shafts. The vertical frame is arranged at left and right sides. The lateral frame is arranged above and supported by the vertical frame. The top cover is arranged above the lateral frame. The plurality of rotary shafts are provided at both ends of the lateral frame, and at a top end of the vertical frame. The inflatable and thermal insulation system includes an air compressor, a dust collector, a dehydrator, a dryer, a constant-pressure and air-releasing controller, and a thermal insulation quilt which are communicated with each other in this order through a pipeline. The thermal insulation quilt is provided in the lateral frame and the vertical frame. The greenhouse has a simple structure, reduces manufacture cost and maintenance cost. The greenhouse has an independent (Continued)

air chamber, which provides a stable air layer with less air convection and ensures thermal insulation property.

6 Claims, 2 Drawing Sheets

(52) U.S. Cl.
CPC ............. *A01G 9/1438* (2013.01); *A01G 9/24* (2013.01); *Y02A 40/262* (2018.01)

(56) References Cited

U.S. PATENT DOCUMENTS

| | | | | |
|---|---|---|---|---|
| 4,390,054 A * | 6/1983 | Niibori | ................. | A01G 9/227 160/265 |
| 4,784,215 A * | 11/1988 | Sing | ................. | A01G 9/225 165/41 |
| 4,986,343 A * | 1/1991 | Sing | ................. | A01G 9/225 126/572 |
| 6,000,170 A * | 12/1999 | Davis | ................. | A01G 9/225 47/17 |
| 6,260,308 B1 * | 7/2001 | Looney | ................. | A01G 9/227 52/63 |
| 6,282,834 B1 * | 9/2001 | Mossey | ................. | A01G 9/1438 47/17 |
| 6,442,903 B1 * | 9/2002 | Hebert | ................. | A01G 9/1415 52/2.11 |
| 6,594,957 B1 * | 7/2003 | Milburn | ................. | A01G 9/1415 52/22 |
| 6,843,019 B2 * | 1/2005 | Mercurio | ................. | A01G 9/242 47/17 |
| 8,397,434 B2 * | 3/2013 | Bayne | ................. | A01G 9/1415 52/2.11 |
| 8,881,489 B2 * | 11/2014 | Yasui | ................. | A01G 9/1415 52/741.1 |
| 2006/0185288 A1 * | 8/2006 | Vineberg | ................. | A01G 9/225 52/408 |
| 2006/0248807 A1 * | 11/2006 | Penna, IV | ................. | A01G 9/241 52/64 |
| 2011/0173903 A1 * | 7/2011 | Yasui | ................. | A01G 9/1415 52/173.1 |
| 2011/0297478 A1 * | 12/2011 | Billiet | ................. | B01D 46/003 181/228 |
| 2016/0309664 A1 * | 10/2016 | Lv | ................. | A01G 9/1415 |

FOREIGN PATENT DOCUMENTS

| | | |
|---|---|---|
| CN | 203633243 U | 6/2014 |
| JP | 2013046646 A | 3/2013 |
| KR | 20130007898 A | 1/2013 |

OTHER PUBLICATIONS

International Search Report for International Application No. PCT/CN2014/074054, dated Oct. 13, 2014, 6 pages.

Sun, Xingming, "Brief Introduction of compressed air purification system and its application", China High-Tech Enterprises, No. 01, Jan. 1, 2008 (Jan. 1, 2008), see p. 94; English translation of "abstract" (reference cited in International Search Report for PCT/CN2014/074054); 3 pages.

* cited by examiner

INFLATABLE THERMAL INSULATION SYSTEM AND MULTI-SPAN GREENHOUSE INCLUDING THE SAME

CLAIM OF PRIORITY

This application claims the benefit of Chinese Patent Application No. 201410001170.1, filed on Jan. 2, 2014, which is incorporated herein by reference in its entirety.

BACKGROUND OF THE DISCLOSURE

Field of the Disclosure

The present disclosure relates to thermal isolation technology, and specifically, to an inflatable and thermal insulation system and a greenhouse including the same.

Description of the Related Art

A large greenhouse has been widely used in precision agriculture in a lot of developed countries, such as Netherlands, Israel, Germany, USA, and the like, and is one of the main production modes in modern agriculture. Recently, many modern greenhouses have been imported into China from other countries. However, most of them have large energy consumption, are under inefficient management, and are finally abandoned.

The greenhouse delivers heat with a large amount at night, from a top roof and surrounding side walls. Moreover, the greenhouse is difficult to have an outer cover, and relies only on an inner thermal insulation system which includes one or more layers of thermal insulation thin films and cannot be sealed. Consequently, the greenhouse cannot ensure winter production, due to a large temperature difference between inside and outside and poor thermal insulation property of the greenhouse, and high energy consumption needed for maintaining a stable temperature.

To solve the above problem, the present disclosure provides an inflatable and thermal insulation system and a greenhouse including the same.

BRIEF DESCRIPTION OF THE DISCLOSURE

To solve the above problem in the prior art, the present disclosure provides an inflatable and thermal insulation system and a greenhouse including the same. The greenhouse having the inflatable and thermal insulation system includes a lateral frame and a vertical frame which are connected to each other by flexible mounting slots. A thermal insulation quilt provides a thermal insulation air layer, which has multiple levels and is stable, at an upper portion inside the greenhouse and at surrounding side walls of the greenhouse. The thermal insulation quilt preserves heat inside the greenhouse to a maximum limit, and reduces heat dissipation from the greenhouse.

According to the present disclosure, there are provided the following solutions.

An inflatable and thermal insulation system comprises an air compressor, a dust collector, a dehydrator, a dryer, a constant-pressure and air-releasing controller, and an air chamber which are communicated with each other in this order through a pipeline.

Preferably, the constant-pressure and air-releasing controller includes an air releasing valve.

Preferably, the air chamber has an inner portion with a honeycomb structure.

Preferably, the air chamber has an inner portion with a grid structure.

Preferably, the air chamber has a reflective coating at an outer surface for reflecting thermal radiation.

Preferably, the air chamber engages with flexible mounting slots at an outer surface, which have a hard outer portion and a soft inner portion.

A greenhouse having an inflatable and thermal insulation system, comprises a lateral frame, a vertical frame, a top cover, an inflatable and thermal insulation system and a plurality of rotary shafts, wherein the vertical frame is arranged at left and right sides, the lateral frame is arranged above and supported by the vertical frame, the top cover is arranged above the lateral frame, the plurality of rotary shafts are provided at both ends of the lateral frame, and at a top end of the vertical frame, the inflatable and thermal insulation system includes an air compressor, a dust collector, a dehydrator, a dryer, a constant-pressure and air-releasing controller, and a thermal insulation quilt which are communicated with each other in this order through a pipeline, the thermal insulation quilt is provided in the lateral frame and the vertical frame.

Preferably, the constant-pressure and air-releasing controller comprises an air releasing valve which controls a pressure of air supplied from the constant-pressure and air-releasing controller to the air chamber to be constant.

Preferably, the plurality of rotary shafts are connected to a plurality of pulling ropes.

Preferably, the thermal insulation quilt is an inflatable and thermal insulation quilt.

Preferably, the top cover has a triangular shape.

Preferably, the top cover is a hemisphere.

Preferably, the thermal insulation quilt has an inner portion with a honeycomb structure.

Preferably, the thermal insulation quilt has an inner portion with a grid structure.

Preferably, the thermal insulation quilt has a reflective coating at an outer surface for reflecting heat radiation.

Preferably, the thermal insulation quilt engages with flexible mounting slots at an outer surface, which have a hard outer portion and a soft inner portion and are used for sealing at top, bottom, left and right sides. The thermal insulation quilt has the functions of sealing and heat preservation.

Compared with the prior art, the greenhouse having the inflatable and thermal insulation system according to the present disclosure has several beneficial effects. The greenhouse having the inflatable and thermal insulation system includes a lateral frame and a vertical frame which are connected to each other by flexible mounting slots. A thermal insulation quilt provides a thermal insulation air layer, which has multiple levels and is stable, at an upper portion inside the greenhouse and at surrounding side walls of the greenhouse. The thermal insulation quilt preserves heat inside the greenhouse to a maximum limit, and reduces heat dissipation from the greenhouse. The greenhouse having the inflatable and thermal insulation system has a simple structure, reduces manufacture cost and maintenance cost, and improves thermal insulation property with less air convection.

1. lateral frame; 2. vertical frame; 3. top cover; 4. inflatable and thermal insulation system; 41. air compressor; 42. dust collector; 43. dehydrator; 44. dryer; 45. constant-pressure and air-releasing controller; 46. thermal insulation quilt; 5 rotary shaft; and 6. flexible mounting slot; and 7. pulling ropes.

DETAILED DESCRIPTION OF EMBODIMENTS OF THE DISCLOSURE

The embodiments of the present disclosure will be further described in conjunction with the accompanying drawings.

Figure 1:
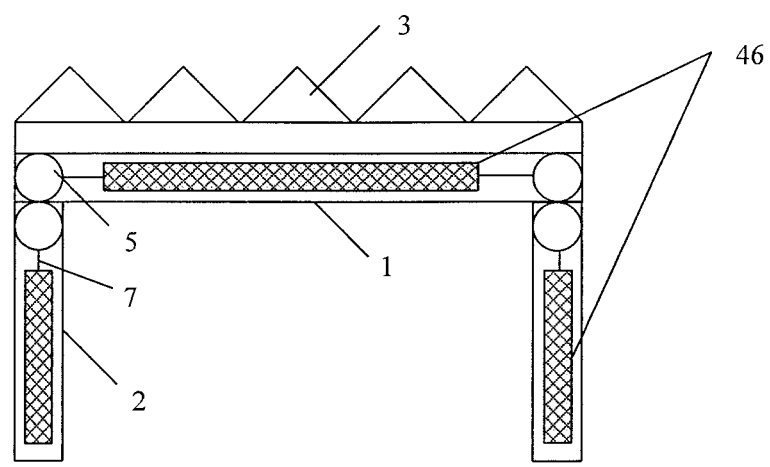
FIG. 1 is a structural diagram showing a greenhouse having an inflatable and thermal insulation system according to an embodiment of the present disclosure.
Figure 2:
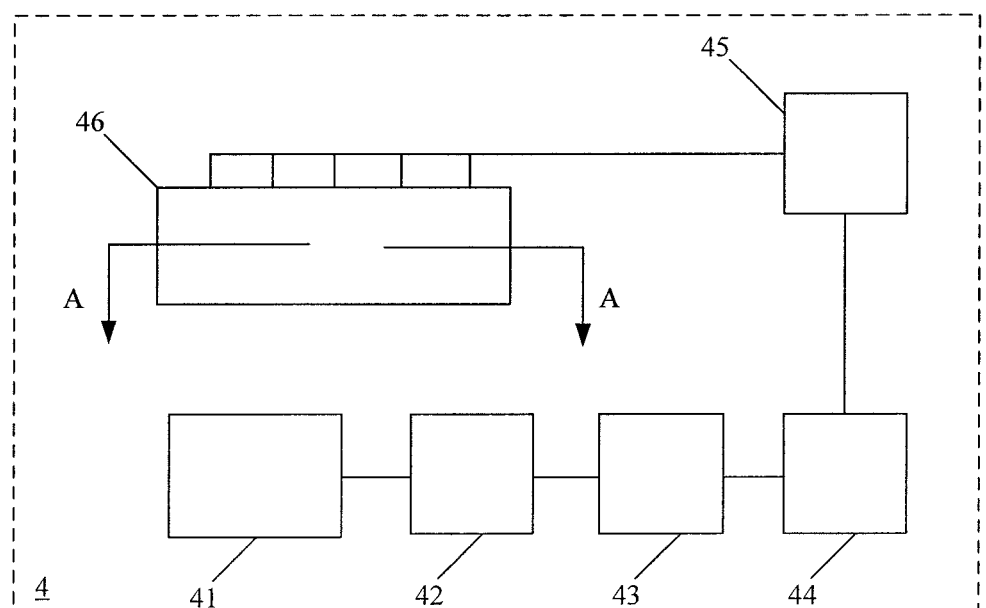
FIG. 2 is a block diagram showing a greenhouse having an inflatable and thermal insulation system accord an embodiment of the present disclosure.
Figure 3:
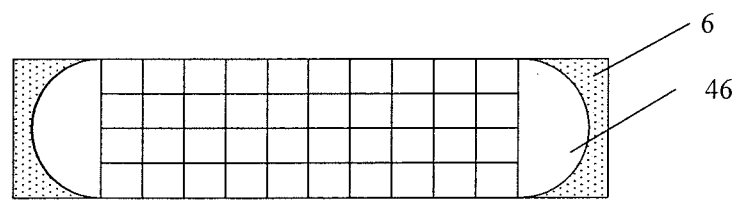
FIG. 3 is a cross sectional view of a thermal insulation quilt engaging with flexible mounting slots according to an embodiment of the present disclosure.
Figure 4:
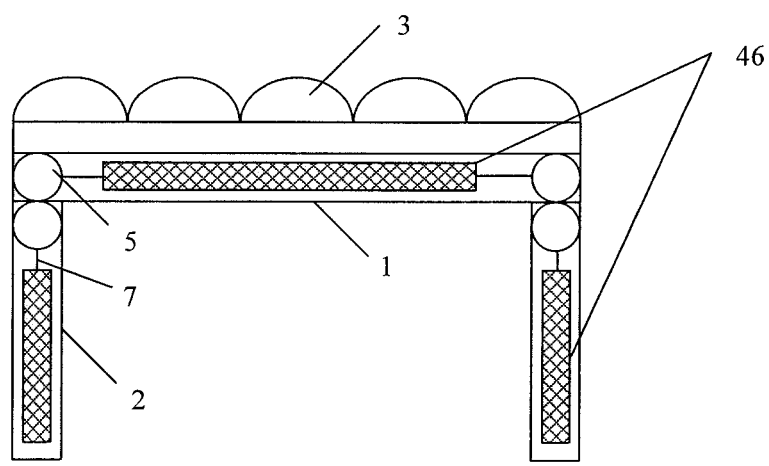
FIG. 4 is a structural diagram showing a greenhouse having an inflatable and thermal insulation system with a hemisphere top cover according to an embodiment of the present disclosure; and Reference numerals in the attached drawings are listed below.

As showing FIGS. 1-4, a greenhouse having an inflatable and thermal insulation system, comprises a lateral frame 1, a vertical frame 2, a top cover 3, an inflatable and thermal insulation system 4 and a plurality of rotary shafts 5, wherein the vertical frame 2 is arranged at left and right sides, the lateral frame 1 is arranged above and supported by the vertical frame 2, the top cover 3 is arranged above the lateral frame 1, the plurality of rotary shafts 5 are provided at both ends of the lateral frame 1, and at a top end of the vertical frame 2, the inflatable and thermal insulation system 4 includes an air compressor 41, a dust collector 42, a dehydrator 43, a dryer 44, a constant-pressure and air-releasing controller 45, and a thermal insulation quilt 46 which are communicated with each other in this order through a pipeline (not shown), the thermal insulation quilt 46 is provided in the lateral frame 1 and the vertical frame 2.

The rotary shafts 5 are connected to pulling ropes 7.

The top cover 3 has a triangular shape. The top cover 3 may be a hemisphere.

The constant-pressure and air-releasing controller 45 comprises an air releasing valve (not shown), which controls a pressure of air supplied from the constant-pressure and air-releasing controller 45 to the thermal insulation quilt 46 to be constant.

The thermal insulation quilt 46 has an inner portion with a honeycomb structure. The thermal insulation quilt 46 has an inner portion with a grid structure.

The thermal insulation quilt 46 is an inflatable and thermal insulation quilt.

The thermal insulation quilt 46 has a reflective coating (not shown) at an outer surface for reflecting heat radiation.

The thermal insulation quilt 46 engages with flexible mounting slots 6 at an outer surface which have a hard outer portion and a soft inner portion and are used for sealing at top, bottom, left and right sides. The flexible mounting slots 6 have the functions of sealing and heat preservation.

The thermal insulation quilt 46 is placed in the lateral frame 1 of the greenhouse, with one end fixed and the other end connected to a pulling rope 7 of a rotary shaft 5. A motor (not shown) drives the rotary shaft 5 to rotate so that the thermal insulation quilt 46 moves. The air compressor 41 is started to draw air from outside into the air compressor 41 and pass it through the dust collector 42, the dehydrator 43, the dryer 44, and finally into the constant-pressure and air-releasing controller 45. The dust collector 42 removes dust from the air, the dehydrator 43 removes water from the air, and the dryer 44 removes moisture from the air. The treated air is controlled by the constant-pressure and air-releasing controller 45 and enters into the thermal insulation quilt 46. The air pressure increases continuously so that the thermal insulation quilt 46 has a stable shape and is inflated. Meanwhile, the thermal insulation quilt 46 engages with the flexible mounting slots 6 to have the functions of sealing and heat preservation. In a case that the thermal insulation quilt 46 reaches a predetermined pressure, the air compressor 41 stops working. In a case that the thermal insulation quilt 46 has insufficient pressure, the air compressor restarts working.

The rotary shafts 5 move the thermal insulation quilt 46 in the lateral frame from left to right, or vice versa, and move the thermal insulation quilt 46 in the vertical frame from top to bottom, or vice versa.

In a sunny day, the rotary shafts 5 move the thermal insulation quilt 46 in the lateral frame 1 to one end, and move the thermal insulation quilt 46 in the vertical frame 2 to a top side. The sun shines and the air releasing valve opens to decrease pressure.

In a cloudy day or at night, the rotary shafts 5 move the thermal insulation shafts 46 to an opposite end, and the air compressor 41 starts working until the thermal insulation quilt 46 reaches the predetermined pressure. The heat in the greenhouse is thus preserved.

The air compressor 41, the dust collector 42, the dehydrator 43, the dryer 44 and the air releasing valve in the embodiment of the present disclosure are conventional apparatus well known by one skilled in the art.

In the above embodiment, the thermal insulation quilt 46 is an example of an air chamber and has the function of thermal insulation by sealing air. In other embodiments, the inflatable and thermal insulation system 4 may be used in a camping tent, a disaster relief tent, a prefab house, and the like. For example, the camping tent may have an air chamber between an inner wall and an outer wall, and is modified to have an inner portion with a honeycomb structure or a grid structure for sealing air.

The present disclosure is described in connection with but not limited to the above embodiment. Any variation, modification and alternative which can be easily conceived by one skilled in the art fall into the scope of the present disclosure.

What is claimed is:

1. A greenhouse for preserving heat and reducing heat dissipation, the greenhouse comprising:
    a lateral frame having opposed ends;
    a vertical frame having a top side and a bottom side;
    a top cover;
    an inflatable and thermal insulation system including a thermal insulation quilt;
    a plurality of rotary shafts; and
    a plurality of flexible mounting slots,
    wherein the lateral frame is arranged above and supported by the vertical frame, the top cover is arranged above the lateral frame;
    wherein the plurality of rotary shafts are provided at both ends of the lateral frame, and at the top end of the vertical frame, wherein the plurality of rotary shafts are driven by a motor to rotate so that the thermal insulation quit moves, wherein the inflatable and thermal insulation system further includes an air compressor, a dust collector, a dehydrator, a dryer, a constant-pressure and air-releasing controller, and the thermal insulation quilt, which are communicated with each other through a pipeline, wherein the plurality of flexible mounting slots are at an outer surface of the thermal insulation quit and are used to seal top, bottom, left and right sides of the thermal insulation quilt, wherein the thermal insulation quilt has an inner portion with a honeycomb structure or a grid structure, and in a sunny day, the rotary shafts move the thermal insulation quilt in the lateral frame to one end, and move the thermal insulation quilt in the vertical frame to the top side and in a cloudy day or at night, the rotary shafts move the thermal insulation quilt to an opposite end, and the air compressor starts working to inflate the thermal insulation quilt.

2. The greenhouse according to claim 1, wherein the constant-pressure and air-releasing controller includes an air releasing valve.

3. The greenhouse according to claim 1, wherein the plurality of rotary shafts are connected to a plurality of pulling ropes.

4. The greenhouse according to claim 1, wherein the top cover has a triangular shape.

5. The greenhouse according to claim 1, wherein the top cover is a hemisphere.

6. The greenhouse according to claim 1, wherein the thermal insulation quilt has a reflective coating at an outer surface for reflecting thermal radiation.

\* \* \* \* \*